US005897829A

United States Patent [19]

Kim et al.

[11] Patent Number: 5,897,829

[45] Date of Patent: Apr. 27, 1999

[54] APPARATUS FOR REDUCING FINE IRON ORE

[75] Inventors: Hang Goo Kim; Il Ock Lee; Uoo Chang Chung; Yong Ha Kim, all of Pohang, Rep. of Korea

[73] Assignees: Pohang Iron & Steel Co., Ltd., Rep. of Korea; Research Institute of Industrial Science & Technology, Rep. of Korea; Voest-Alpine Industrieanlagenbau GmbH, Austria

[21] Appl. No.: 08/894,802

[22] PCT Filed: Dec. 28, 1996

[86] PCT No.: PCT/KR96/00261

§ 371 Date: Aug. 28, 1997

§ 102(e) Date: Aug. 28, 1997

[87] PCT Pub. No.: WO97/24463

PCT Pub. Date: Jul. 10, 1997

[30] Foreign Application Priority Data

Dec. 29, 1995 [KR] Rep. of Korea ...................... 95-65208

[51] Int. Cl.[6] ...................................................... C21B 13/14

[52] U.S. Cl. ............................................ 266/172; 266/156

[58] Field of Search .................................... 266/172, 142, 266/156; 75/444, 450

[56] References Cited

U.S. PATENT DOCUMENTS

| | | | |
|---|---|---|---|
| 5,192,486 | 3/1993 | Whipp | 266/172 |
| 5,370,727 | 12/1994 | Whipp | 75/436 |
| 5,439,504 | 8/1995 | Czermak et al. | 266/172 |
| 5,531,424 | 7/1996 | Whipp | 266/172 |

FOREIGN PATENT DOCUMENTS

| | | |
|---|---|---|
| 1114653 | 2/1989 | Japan . |
| 0074056 | 2/1994 | Rep. of Korea . |

OTHER PUBLICATIONS

Japanese Utility Model Laid–Open No. Hei–1–114653 Abstract, Aug. 2, 1989, 1 p., English language.

Korean Patent No. 74056 Abstract, Feb. 14, 1994, 2 pp., English language.

*Primary Examiner*—Scott Kastler
*Attorney, Agent, or Firm*—Webb Ziesenheim Bruening Logsdon Orkin & Hanson, P.C.

[57] ABSTRACT

A device for three-stage fluidized bed for reducing a fine iron ore in accordance with the present invention comprises: a first single-type fluidized bed furnace for drying/pre-heating a fine iron ore in a bubbling fluidized state; a first cyclone for collecting fine iron ore particles entrained in an exhaust gas from the first fluidized bed furnace; a second single-type fluidized bed furnace for pre-reducing the fine iron ore dried/pre-heated in the first fluidized bed furnace; a second cyclone for collecting fine iron ore particles entrained in an exhaust gas from the second fluidized bed furnace; a third twin-type fluidized bed furnace comprising a first cylindrical reaction furnace and a second reaction furnace for finally reducing coarse iron ore particles and medium/fine iron ore particles, respectively, which are pre-reduced in the second fluidized bed furnace; a third cyclone for collecting medium/fine iron ore particles entrained in an exhaust gas from the first reaction furnace of the third fluidized bed furnace; and a fourth cyclone for collecting ultrafine iron ore particles entrained in an exhaust gas from the second furnace of the third fluidized bed furnace.

6 Claims, 6 Drawing Sheets

APPARATUS FOR REDUCING FINE IRON ORE

FIELD OF THE INVENTION

The present invention relates to a device of three-stage fluidized bed furnace type for reducing a fine iron ore having a wide particle-size, distribution so as to produce a directly reduced iron (DRI) to be charged into a melting furnace and, more particularly to a device of three-stage fluidized bed furnace type for reducing a fine iron ore having a wide particle size distribution in the state of stable fluidization while achieving a optimumal reduction degree and energy consumption by the use of a high-temperature reducing gas of a large CO and $H_2$ contents, in which the reduction and degradation characteristics of the iron ore at high temperature are fully reflected.

DESCRIPTION OF THE PRIOR ART

In general, a conventional method of melting reduction includes the steps of charging an iron ore pre-reduced in a common reducing furnace to a melting furnace and reducing it into an iron while melting. In the reducing furnace, which is to reduce the iron ore in a solid state before melting it, the charged iron ore is exposed to a high-temperature reducing gas for reduction.

Such a reduction process is classified into a moving bed type process and a fluidized bed type process depending on the contact condition of the iron ore and the reducing gas. It has been known that the most effective method of reducing a fine iron ore is the fluidized bed type process where the fine iron ore having a wide particle size distribution is reduced in a reducing furnace with a reducing gas supplied through a distribution plate installed in the lower part of the furnace so as to reduce the iron ore at a fluidizing state.

An example of the fluidized bed type furnace for reducing a fine iron ore is disclosed in Japanese utility model laid-open No. Hei-1-114653, which is shown in FIG. 1. The fluidized bed type reducing furnace includes a cylindrical reducing furnace 111 and a cyclone 115, wherein the cylindrical reducing furnace 111 having a iron ore inlet hole 112, high-temperature reducing gas inlet 113, a reduced iron ore outlet 114 and a gas distributor 116 in the lower part thereof.

In the reducing furnace as described above, the fine iron ore is charged into the cylindrical reducing furnace 111 and a reducing gas is supplied to the furnace through the gas distributor 116 at an appropriate gas velocity. Then, the fine iron ore is mixed with the reducing gas and reduced in the fluidization state in which a gas ascending through the fire ore bed forms a bubbling fluidized bed with fine ore particles. The reduced iron ore is discharged through the outlet 114.

In FIG. 1, the dotted arrow represents a gas flow and the solid line a ore flow.

Generally, in such a fluidized bed type reducing furnace the fluidization in the bed should be maintained actively while the gas velocity is kept low in order to decrease the elutriated amount of the flying iron and increase gas efficiency, which leads to a problem of a conventional fluidized bed type reducing furnace in that the particle size of the iron ore is limited.

The above conventional reducing furnace can only accommodate an iron ore having the particle size of below 1 mm. But, in reality, the fine iron ore contains 50% of the iron ore having the particle size larger than 1 mm.

For that reason, the iron ore is to be classified before the reduction process and then a coarse iron ore is transferred to a shaft furnace or crushed to powder, which results in the needs of additional facilities and the increase of the number of processes units.

A twin-type fluidized bed reducing furnace to solve the above mentioned problems is disclosed in the Korean Patent Application No. 74056, by which a good-quality reduced iron can be obtained from its uniform concentration distribution and stable fluidization by properly separating the iron ore into a coarse iron ore and a medium/fine iron ore particles.

However, the above-described twin-type fluidized bed reducing furnace has two furnaces connected to each other through a circulation duct. Via the circulation duct, a large amount of high-temperature gas exhausted in a first reducing furnace, containing a highly oxidized gas, is transferred from the upper part of a first reducing furnace to the lower part of a second reducing furnace together with the entrained medium/fine iron ore. Therefore, the highly oxidized gas is mixed with a high-temperature reducing gas newly supplied to the lower part of the second reducing furnace.

This causes the reductant gas in the second reducing furnace to lose its reducing power and also results in a heavy elutriation of fine iron ore with an increase in the gas amount (gas velocity). Furthermore, because the iron ores in the second reducing furnace are very fine, a defluidization of iron ore may take place due to a agglomeration between the fine iron ore particles.

SUMMARY OF THE INVENTION

Accordingly, the present invention is directed to a device of three-stage fluidized bed furnace type for reducing a fine iron ore that substantially solves one or more of the problems due to limitations and disadvantages of the related art.

An object of the present invention is to provide a device of three-stage fluidized bed furnace type for reducing a fine iron ore which is constructed to separately carry out the final reductions of the coarse and medium/fine iron ores with two separate reaction furnaces, on the basis that the degradation of the fine iron ores is almost completed during the early stage of a high-temperature fluidized bed reduction, that is a pre-heating and pre-reduction stage, and the gas consumption rate can be improved by a separate fluidized bed reduction of the coarse iron ore and the medium/fine iron ore.

Another object of the present invention is to provide a device of three-stage fluidized bed furnace type for reducing a fine iron ore, by which problems of a sticking and a non-fluidization can be solved as well as the controlled classification of the iron ore.

Additional features and advantages of the invention will be set forth in the description which follows, and in part will be apparent from the description, or may be learned by practice of the invention. The objectives and other advantages of the present invention will be realized and attained by the structure particularly pointed out in the written description and claims hereof as well as the appended drawings.

To achieve these and other advantages and in accordance with the purpose of the present invention, as embodied and broadly described, the device of the three-stage fluidized bed furnace type for reducing a fine iron ore in accordance with the present invention comprises: a first single-type fluidized bed furnace for drying/pre-heating a fine iron ore in a bubbling fluidized state; a first cyclone for collecting a fine iron ore particles entrained in an exhaust gas from the first fluidized bed furnace; a second single-type fluidized bed furnace for pre-reducing the fine iron ore dried/pre-heated in the first fluidized bed furnace; a second cyclone for collecting a fine iron ore particles entrained in an exhaust gas from the second fluidized bed furnace; a third twin-type fluidized bed furnace comprising first and second cylindrical reaction furnace and second reaction furnace for finally reducing a coarse iron ore and a medium/fine iron ore, respectively, which are pre-reduced in the second fluidized bed furnace; a third cyclone for collecting medium/fine iron ore particles entrained in an exhaust gas from the first reaction furnace of the third fluidized bed furnace; and a fourth cyclone for collecting an ultrafine iron ore particles entrained in an exhaust gas from the second furnace of the third fluidized bed furnace.

Further, the present invention is a device of three-stage fluidized bed furnace type for reducing a fine iron ore, which comprises a first single-type fluidized bed furnace for drying/pre-heating the fine iron ore in a bubbling fluidized state; a second serial twin-type fluidized bed furnace having a high-gas-velocity region and a low-gas-velocity region for classifying the iron ore of wide size distribution dried/preheated in the first fluidized bed furnace into a coarse iron ore and a medium/fine iron ore and pre-reducing them in the separate regions while forming a bubbling fluidized bed in each region; a third twin-type fluidized bed for finally reducing coarse and medium/fine ores in separate reaction furnaces while forming a bubbling fluidized bed in each reaction furnace.

BRIEF DESCRIPTION OF THE DRAWINGS

The accompanying drawings, which are included to provide a further understanding of the invention and are incorporated in and constitute a part of this specification, illustrate embodiments of the invention and serve to explain the principles of the invention together with the description.

In the drawings.

DETAILED DESCRIPTION OF PREFERRED EMBODIMENT

The preferred embodiments of the present invention are described in detail in conjunction with the accompanying drawings.

Figure 1:
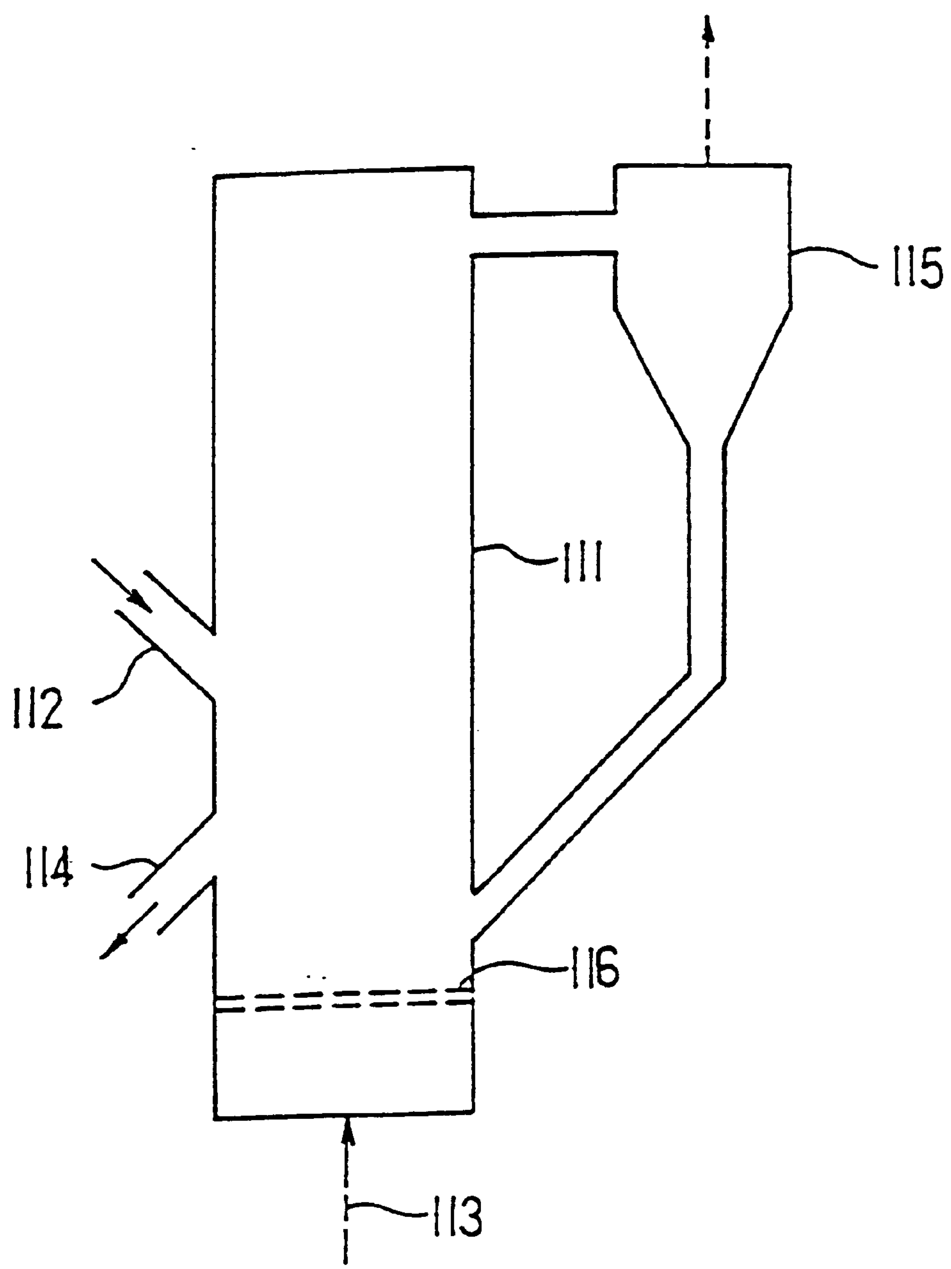
FIG. 1 shows the schematic diagram of a conventional fluidized bed type furnace for reducing a fine iron ore.
Figure 2:
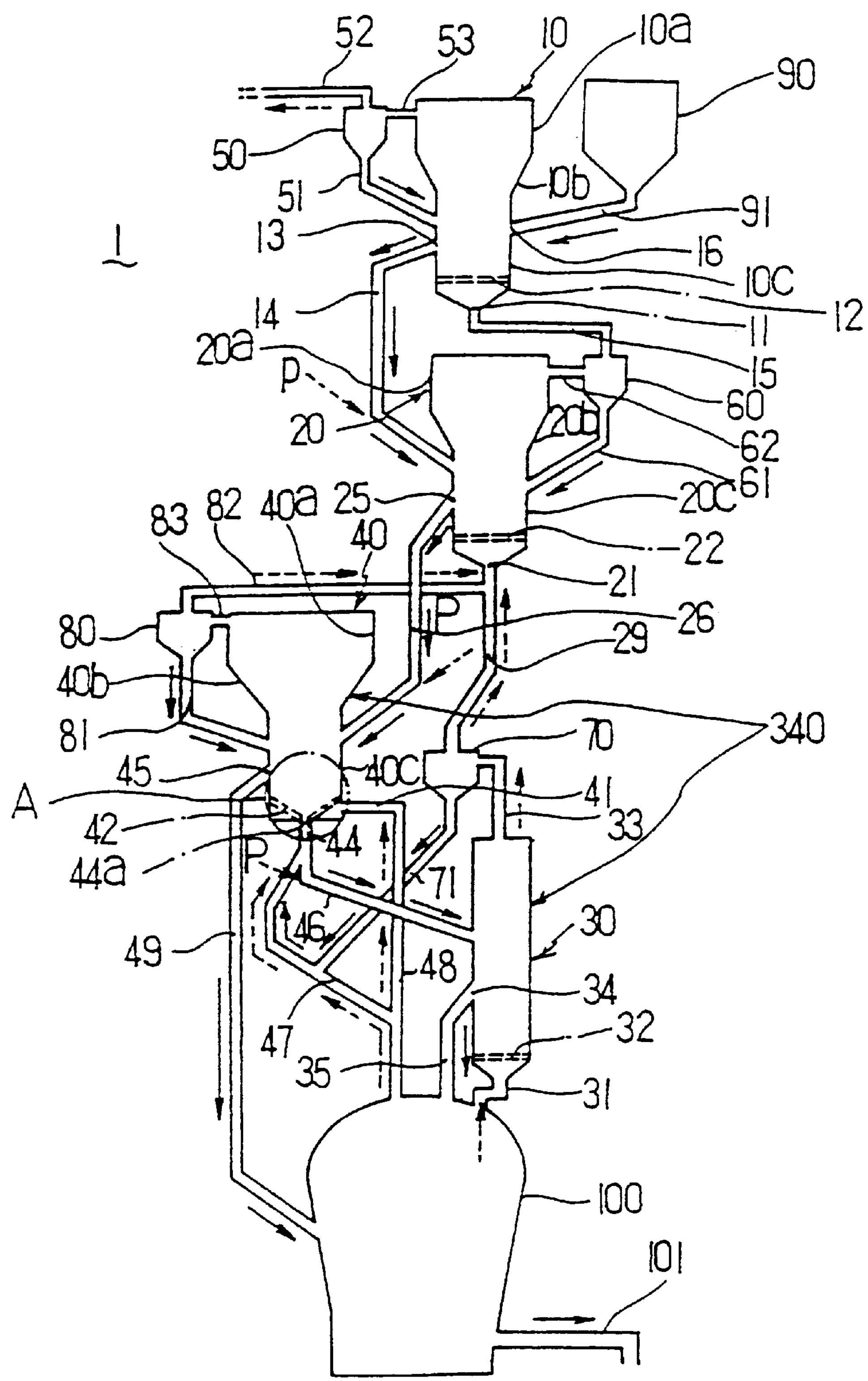
FIG. 2 shows the schematic diagram of a device of three-stage fluidized bed furnace type for reducing a fine iron ore in accordance with a preferred embodiment of the present invention.

Referring to FIG. 2, a device 1 of the three-stage fluidized bed furnace type for reducing a fine iron ore in accordance with the present invention comprises: a first single-type fluidized bed furnace 10 for drying/pre-heating a fine iron ore charged from a hopper 90 by means of an exhaust gas from a second cyclone 60 while forming a bubbling fluidized bed; a first cyclone 50 for collecting fine iron ore particles entrained in an exhaust gas from the first fluidized bed furnace 10; a second single-type fluidized bed furnace 20 for pre-reducing the fine iron ore dried/pre-heated in the first fluidized bed furnace 10 while forming a bubbling fluidized bed; the second cyclone 60 for collecting fine iron ore particles entrained in an exhaust gas from the second fluidized bed furnace 20; a third twin-type fluidized bed furnace 340 comprising first cylindrical reaction furnace 30 and second reaction furnace 40 for finally reducing a coarse iron ore and a medium/fine iron ore, respectively, which are pre-reduced in the second fluidized bed furnace 20; a third cyclone 70 for collecting a medium/fine iron ore entrained in an exhaust gas from the first reaction furnace 30 of the third fluidized bed furnace; and a fourth cyclone 80 for collecting an ultrafine iron ore particles entrained in an exhaust gas from the second furnace of the third fluidized bed furnace.

The first fluidized bed furnace 10 comprises a first expanded portion 10*a*, a first tapered portion 10*b* and a first narrowed portion 10*c*. The first narrowed portion 10*c* is provided with a first exhaust gas inlet 11 at the bottom, a first gas distributor 12 above the first exhaust gas inlet 11, a first iron ore outlet 13 in one side wall and a iron ore inlet 16 in the other side. The first expanded portion 10*a* and the first narrowed portion 10*c* are connected to the first cyclone 50 through a sixteenth duct 53 and a first duct 51, respectively. The iron ore inlet 16 is connected to one end of a seventeenth duct 91, the other end of which is connected to the hopper 90. A gas exhaust gas outlet 52 is provided at the top end of the first cyclone 50 so as to lastly discharging the exhaust gas.

The second fluidized bed furnace 20 comprises a second expanded portion 20*a*, a second tapered portion 20*b* and a second narrowed portion 20*c*. The second narrowed portion 20*c* is provided with a second exhaust gas inlet 21 at the bottom end and a second gas distributor 22 above the second exhaust gas inlet. Further, the second expanded portion 20*a* and the second narrowed portion 20*c* are connected to the second cyclone 60 through a eighteenth duct 62 and a fourth duct 61, respectively.

One side of the second narrowed portion 20*c* has a second iron ore outlet 25 and is connected to the first iron ore outlet 13 through a second duct 14. The upper part of the second cyclone 60 is connected to the first exhaust gas inlet 11 through a third duct 15.

The first reaction furnace 30 of the third fluidized bed furnace 340 is in a cylindrical shape. The first reaction furnace 30 has a third exhaust gas inlet 31 at its bottom end so as to be supplied with the exhaust gas of a melting furnace 100 and is provided with a third distributor 32 in its lower part.

One side of the first reaction furnace 30 has a third iron ore outlet 34, which is connected to the upper part of the melting furnace 100 through an eighth duct 35, and is connected to the second reaction furnace 40 through a ninth duct 46. Further, the upper part of it is connected to the third cyclone 70 through the nineteenth duct 33. The third cyclone 70 is connected to the second fluidized bed furnace 20 through a seventh duct 29 which is connected to the second exhaust gas inlet 21 so as to supply the exhaust gas to the second fluidized bed furnace 20.

Figure 5:
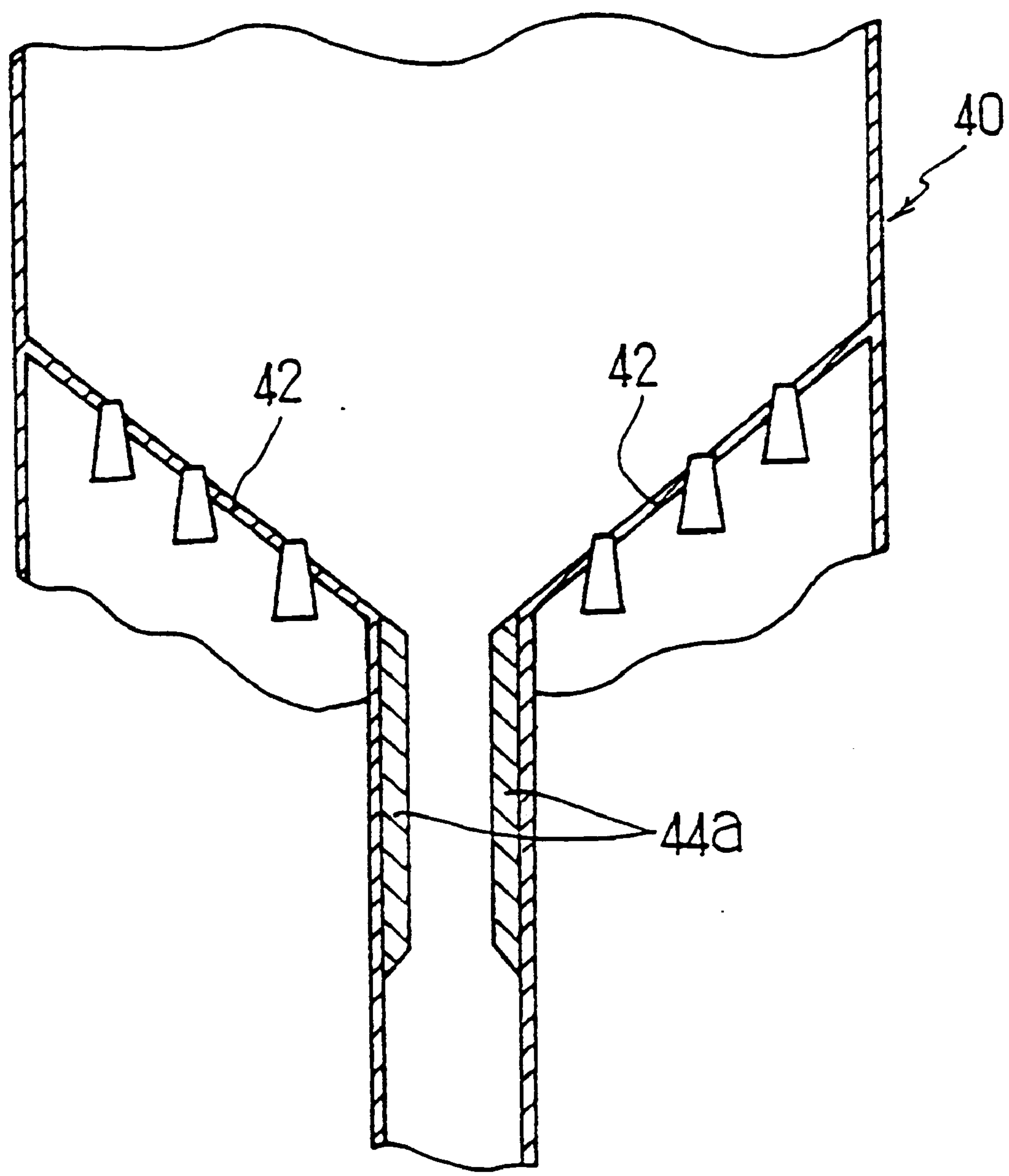
FIG. 5 is an enlarged cross-sectional view of the part "A" in FIGS. 2 and 3.

The second reaction furnace 40 of the third fluidized bed furnace 340 comprises a third expanded portion 40*a*, a third tapered portion 40*b* and a third narrowed portion 40*c*. The third narrowed portion 40*c* has a fifth iron ore outlet 44 at its bottom end and is provided with a fourth conical distributor 42 inside of it. It is preferable to install a reducing fin 44*a* in the fifth iron ore outlet 44 as shown in FIG. 5 in order to increase the gas velocity.

Further, one side of the third narrowed portion 40*c* has a fourth iron ore outlet 45 which is connected to the melting furnace 100 through the twelfth duct 49.

The third expanded portion 40*a* and the third narrowed portion 40*c* are connected to the fourth cyclone 80 through a twentieth duct 83 and a fourteenth duct 81, respectively. The upper part of the fourth cyclone 80 is connected to a fifteenth duct 82 which is merged with the seventh duct 29.

The other side of the third narrowed portion 40*c* is connected to a sixth duct 26, which is connected to the second iron ore outlet 25 of the second fluidized bed furnace 20, and has a fourth exhaust gas inlet 41 which is located below the fourth conical distributor 42 and connected to the melting furnace 100 through a eleventh duct 48.

The eleventh duct 48 is connected with a tenth duct 47 and the tenth duct 47 is merged with the ninth duct 46 and a thirteenth duct 71 which is connected to the third cyclone 70. A pig iron outlet 101 is formed in the melting furnace 100. Further, each of the second duct 14, the sixth duct 26 and the ninth duct 46 is preferably provided with a purging gas inlet P so as to prevent the transport of iron ore from being blocked.

In FIG. 2, the dotted arrow represents a gas flow and the solid line a ore flow.

Figure 3:
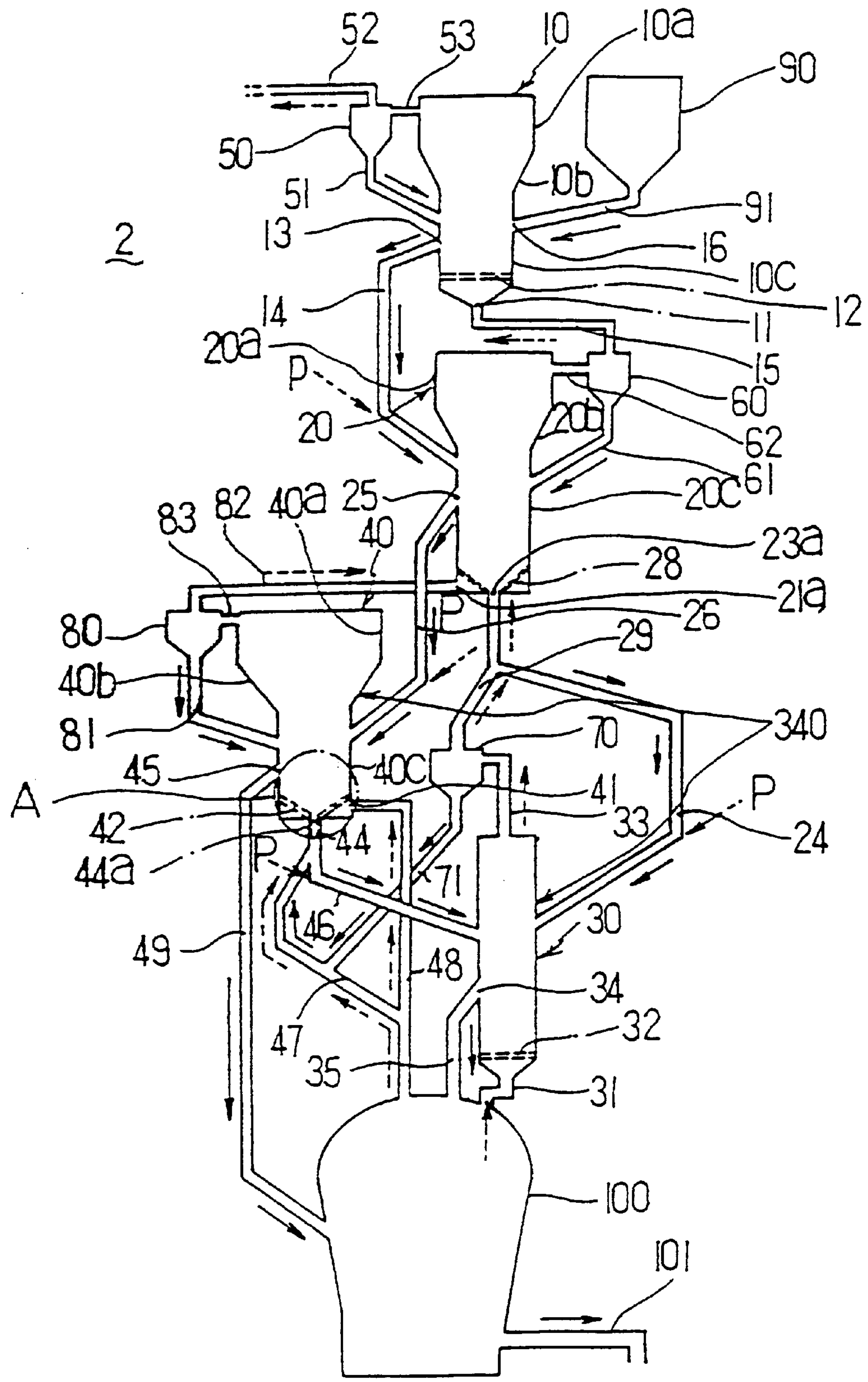
FIG. 3 shows the schematic diagram of a device of three-stage fluidized bed furnace type for reducing a fine iron ore in accordance with a preferred embodiment of the present invention.

FIG. 3 shows a device of three-stage fluidized bed furnace type for reducing a fine iron ore according to another preferred embodiment of the present invention.

In a reducing device 2 of three-stage fluidized bed furnace type as shown in FIG. 3, in addition to the device 1 of FIG. 2, the second narrowed portion 20*c* of the second fluidized bed furnace 20 has a sixth exhaust gas inlet/iron ore center outlet 23*a* at its bottom end and is provided with a second conical distributor 28 above the sixth exhaust gas inlet/iron ore center outlet 23*a*.

A fifteenth duct 82 is connected to a second exhaust gas inlet 21*a* which is formed on one side of the second narrowed portion 20*c* of the second fluidized bed furnace 20 (at the lower part under the second conical distributor 28). The sixth exhaust gas inlet/iron ore center outlet 23*a* is connected to a first reaction furnace 30 through a fifth duct 24 and a seventh duct 29 is connected to the fifth duct 24. It is preferable to form a purging gas inlet P on each of a second duct 14, the fifth duct 24, a sixth duct 26 and a ninth duct 46 so as to prevent the transport of iron ore from being blocked.

In FIG. 3, the dotted arrow represents a gas flow and the solid line indicates a ore flow.

On the other hand, as for a first fluidized bed furnace 10, the second fluidized bed furnace 20 and a second reaction furnace 40 of a third fluidized bed furnace 340, it is desirable to activate the gas fluidization in the lower part of the each furnace and design the furnace in an expanded-upper-narrowed-lower shape that the inner diameter of the upper part is larger than that of the lower part so as to decrease the gas velocity in the furnace, which can improve a gas consumption rate and prevent the elutriation of ultrafine iron ore particles.

A method of reducing the fine iron ore by using the device of the three-stage fluidized bed furnace type according to the present invention of FIG. 3 is described as follows.

The fine iron ore supplied from a hopper 90 into the first fluidized bed furnace 10 via a seventeenth duct 91 is dried/pre-heated in a state of its bubbling fluidization using the exhaust gas from a second cyclone 60 which is provided through a third duct 15 and a first exhaust gas inlet 11, and then supplied to the second fluidized bed furnace 20 via a first iron ore outlet 13 and the second duct 14.

The fine iron ore charged to the lower part of the second fluidized bed furnace 20 is pre-reduced by the exhaust gases from a third cyclone 70 supplied through the seventh duct 29 and from a fourth cyclone 80 supplied through the fifteenth duct 82 while forming a bubbling fluidized bed of the iron ore, and transferred to the second reaction furnace 40 of the third fluidized bed furnace 340 via a second iron ore outlet 25 and the sixth duct 26.

In the second reaction furnace 40, a medium/fine iron ore particle is fluidized out of the pre-reduced iron ore and a coarse iron ore falls down into the first reaction furnace 30 via a fifth iron ore outlet (center outlet) 44, that is, the coarse iron ore particles are separated from the medium/fine iron ore particles by supplying the exhaust gas of a melting furnace 100 into the second reaction furnace 40 (through a tenth duct 47, a eleventh duct 48 and a fourth exhaust gas inlet 41) in a gas velocity lower than the minimum fluidization velocity of the coarse particles but higher than that of medium particles.

Then, the coarse iron ore in the first reaction furnace 30 is finally reduced by the exhaust gas of the melting furnace 100 supplied through a third exhaust gas inlet 31 and supplied to the melting furnace 100 via a third iron ore outlet 34 and an eighth duct 35. The medium/fine iron ore particle which is finally reduced in the second reaction furnace 40 is transferred to the melting furnace 100 via a fourth iron ore outlet 45 and the twelfth duct 49.

Therefore, the coarse and medium/fine iron ores are finally reduced in the first and second reaction furnaces 30 and 40, respectively, by two different streams of the exhaust gas from the melting furnace 100 in different gas velocity while forming bubbling fluidized beds, and discharged through the third and fourth iron ore outlets 34 and 45, respectively. Then, they are melted and further reduced into metal phase in the melting furnace 100 and discharged as a pig iron through a hot metal outlet 101.

The fine iron ore particles entrained in a reducing gas supplied from the first fluidized bed furnace 10 are collected by a first cyclone 50 and re-circulated to the lower part of the first fluidized furnace 10 via a first duct 51. The fine iron ore particle entrained in a reducing gas supplied from the second fluidized bed furnace 20 is collected by the second cyclone 60 and re-circulated to the lower part of the second furnace 20 via a fourth duct 61.

The medium/fine iron ore entrained in a reducing gas supplied from the first reaction furnace 30 is collected by the third cyclone 70 and re-circulates to the first reaction furnace 30 via a thirteenth duct 71, the tenth duct 47, the fifth iron ore outlet(center outlet) 44 and the ninth duct 46. The ultrafine iron ore particles entrained in a reducing gas supplied from the second reaction furnace 40 is collected by the fourth cyclone 80 and re-circulates to the lower part of the second reaction furnace 40.

In this embodiment, the gas velocity in each of the first fluidized bed furnace 10, the second fluidized bed furnace 20 and the second reaction furnace 40 is preferably kept to be 1.5–3.0 times of the minimum fluidization velocity of the iron ore resided in each furnace, the gas velocity in the upper part of each furnace is preferably kept to below the terminal velocity of iron ore being elutriated, and the gas velocity in the first reaction furnace 30 is preferably 1.5–3.0 times as high as the minimum fluidization velocity of coarse iron ore particles.

Further, the second duct 14, the sixth duct 26 and the ninth duct 46 are preferably provided with purging gas inlet P so as not to be clogged.

On the other hand, the device of a three-stage fluidized bed furnace-type for reducing a fine iron ore in accordance with the present invention is preferably applicable in the case when the fine ore particles are agglomerated into lumps larger than a limited size to be fluidized during a pre-reduction, because a defluidization caused by the agglomeration in the second fluidized bed furnace 20 can be avoidable by circulating the agglomerated iron ore into the first furnace 30 through the fifth duct 24.

As described above, the third fluidized bed furnace of the present invention is a twin-type fluidized bed furnace which is designed to separately carry out the final reductions of the coarse and medium/fine iron ores with two separate reaction furnaces, on the basis that the classification of the fine iron ores is almost completed during the early stage of a high-temperature fluidized bed reduction, that is a pre-heating and pre-reduction step, and the gas consumption rate can be improved by a separate fluidized bed reduction of the coarse iron ore and the medium/fine iron ore.

In a conventional twin-type fluidized bed furnace, one side of the upper part of a first reaction furnace is connected to one side of the lower part of a second reaction furnace through a duct and the reducing gas velocity in the first reaction furnace is controlled to be higher than the terminal velocity of the medium size iron ore particles, so that the medium/fine iron ore out of the iron ores supplied into the first reaction furnace is entrained in the reducing gas and transported into the second reaction furnace and thus reduced separately from the coarse iron ore.

Unlike the conventional twin-type fluidized bed furnace, according to the present invention, the pre-heated iron ore is first charged to the second reaction furnace which has a conical distributor inside thereof. The superficial gas velocity of the reducing gas in the second reaction furnace is controlled so that only the medium/fine iron ore particles can be fluidized and the coarse iron ore particles fall down into the first reaction furnace.

Therefore, the problem caused by the mixing between a reacted gas and a unreacted gas in the conventional twin-type fluidized bed furnace can be solved by separating the coarse iron ore from the medium/fine iron ore and finally reducing them in different reaction furnaces of bubbling fluidized beds.

Moreover, the present invention can prevent a sticking and a defluidization in the second reaction furnace, because there is some time, although very short, when the coarse iron ore stays in the second reaction furnace before falling down into the first reaction furnace, and the coarse iron ore produced by the agglomeration of the fine iron ore particle can be discharged as well as the initially coarse iron ore through the conical gas distributor which is fitted with a center outlet.

According to the present invention, the gas consumption rate can be reduced because the coarse iron ore, which takes a longer time than the medium/fine iron ore to be completely reduced can be reduced, to some degree in the course of passing the second reaction furnace before being charged into the first reduction furnace.

Figure 4:
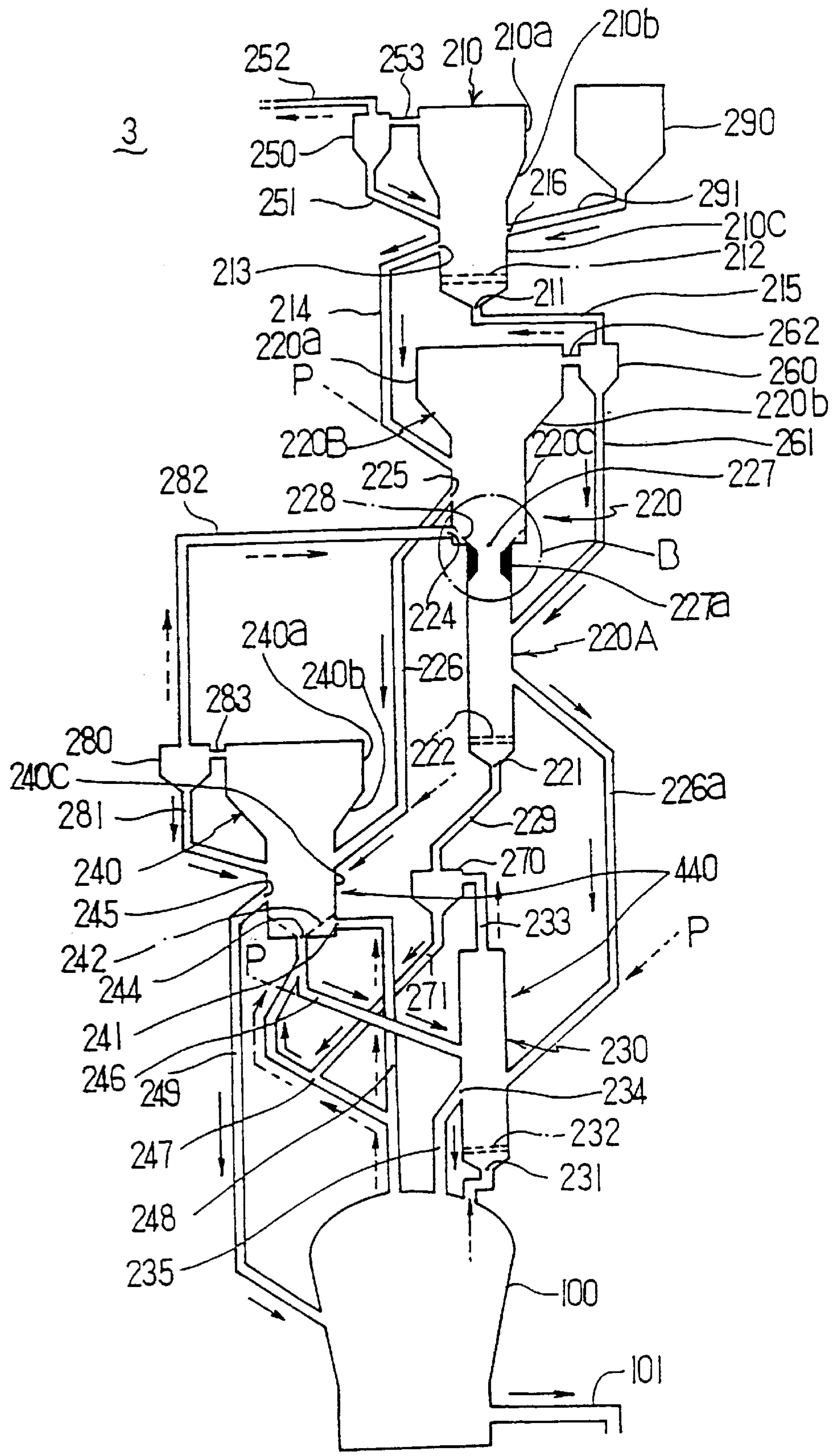
FIG. 4 shows the schematic diagram of a device of three-stage fluidized bed furnace type for reducing a fine iron ore in accordance with another preferred embodiment of the present invention.

Referring now to FIG. 4, a device 3 of a three-stage fluidized bed furnace type for reducing a fine iron ore of a wide particle size distribution in accordance with another further preferred embodiment of the present invention, comprises:

a first single-type fluidized bed furnace 210 for drying/pre-heating a fine iron ore charged from a hopper 290 by means of an exhaust gas from a second cyclone 260 while forming a bubbling fluidized bed; a first cyclone 250 for collecting fine iron ore particles entrained in an exhaust gas from the first fluidized bed furnace 210; a second serial twin-type fluidized bed furnace 220 comprising a high-gas-velocity region 220A and a low-gas-velocity region 220B, for classifying the fine iron of wide size distribution dried/pre-heated in the first fluidized bed furnace 210 into coarse and medium/fine iron ore particles and pre-reducing them separately in the bubbling fluidized beds, respectively; the second cyclone 260 for collecting fine iron ore particles entrained in an exhaust gas from the second fluidized bed furnace 220; a third twin-type fluidized bed furnace 440 comprising first cylindrical reaction furnace 230 and second reaction furnace 240 for finally reducing a coarse iron ore pre-reduced in the high-gas-velocity region 220A of the second serial twin-type fluidized bed 220 and a medium/fine iron ore pre-reduced in the low-gas-velocity region 220B of the second serial twin-type fluidized bed 220, respectively, a third cyclone 270 for collecting medium/fine iron ore particles entrained in an exhaust gas from the first reaction furnace 230 of the third fluidized bed furnace 440; and a fourth cyclone 280 for collecting an ultrafine iron ore particles entrained in an exhaust gas from the second furnace 240 of the third fluidized bed furnace 440.

The first fluidized bed furnace 210 comprises a first expanded portion 210*a*, a first tapered portion 210*b* and a first narrowed portion 210*c*. The first narrowed portion 210*c* is provided with a first exhaust gas inlet 211 at the bottom, a first gas distributor 212 above the first exhaust gas inlet 211, a first iron ore outlet 213 in one side of the first narrowed portion. 210*c* and an iron ore inlet 216 in the other side of it. The first expanded portion 210*a* and the first narrowed portion 210*c* are connected to the first cyclone 250 through a sixteenth duct 253 and a first duct 251, respectively. The iron ore inlet 216 is connected to one end of a seventeenth duct 291, the other end of which is connected to the hopper 290. A exhaust gas outlet 252 is provided at the top end of the first cyclone 250 so as to lastly discharging the exhaust gas.

The second fluidized bed furnace 220 includes a cylindrical high-gas-velocity region 220A and a low-gas-velocity region 220B comprising a second expanded portion 220*a*, a second tapered portion 220*b* and a second narrowed portion 220*c*. There is a fifth exhaust gas inlet 221 at the bottom end of the high-gas-velocity region so as to be supplied with the exhaust gas from the third cyclone 270 and a second distributor 222 in its lower part. The low-gas-velocity region has a sixth iron ore outlet 227 at the bottom end so as to discharge a coarse iron ore and is provided with a conical gas distributor 228 in its lower part.

Figure 6:
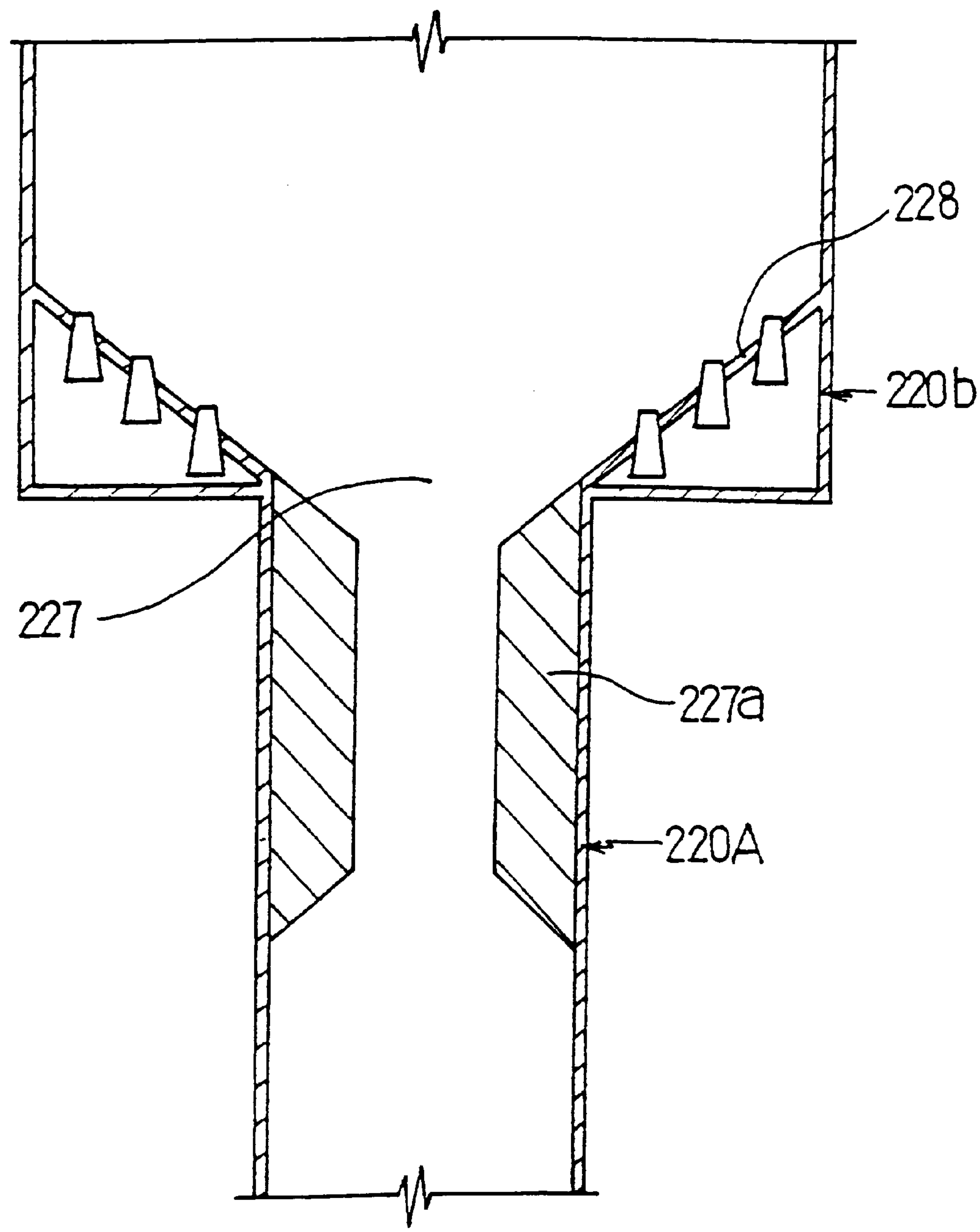
FIG. 6 is an enlarged cross-sectional view of the part "B" in FIG. 4.

Additionally in the lower part of the second narrowed portion 220*c* below the conical gas distributor 228, there is a second exhaust gas inlet 224 connected to the fourth cyclone 280 through the fifteenth duct 282. It is preferable to install a reducing fin 227*a* in the upper part of the high-gas-velocity region 220A as shown in FIG. 6 in order to increase the superficial gas velocity. Further, the second expanded portion 220*a* of the low-gas-velocity region 220B and the high-gas-velocity region 220A are connected to the second cyclone 260 through a eighteenth duct 262 and a fourth duct 261, respectively.

One side of the second narrowed portion 220*c* has a second iron ore outlet 225 and is connected to the first iron ore outlet 213 through a second duct 214. The upper part of the second cyclone 260 is connected to the first exhaust gas inlet 211 through a third duct 215.

The first reaction furnace 230 of the third fluidized bed furnace 440 is in a cylindrical shape. The first reaction furnace 230 has a third exhaust gas inlet 231 at its bottom end so as to be supplied with the exhaust gas from a melting furnace 100 and is provided with a third distributor 232 in its lower part.

One side of the first reaction furnace 230 has a third iron ore inlet 234, which is connected to the upper part of the melting furnace 100 through an eighth duct 235, and is connected to the second reaction furnace 240 through a ninth duct 246. Further, the upper part of it is connected to the third cyclone 270 through the nineteenth duct 233. The upper part of the third cyclone 270 is connected to the second exhaust gas inlet 221 through a seventh duct so as that the exhaust gas can be supplied to the second fluidized bed furnace 220. The first reaction furnace 230 is connected to the high-gas-velocity region 220A of the second fluidized bed furnace 220 through a twenty-first duct 226*a*.

The second reaction furnace 240 of the third fluidized bed furnace 440 comprises a third expanded portion 240*a*, a third tapered portion 240*b* and a third narrowed portion 240*c*. The third narrowed portion 40*c* has a fifth exhaust gas inlet 244 at its bottom end and is provided with a second conical distributor 242 inside of it.

Further, one side of the third narrowed portion 40*c* has a fourth iron ore outlet 245 which is connected to the melting furnace 100 through the twelfth duct 249. The third expanded portion 240*a* and the third narrowed portion 40*c* are connected to the fourth cyclone 280 through a twentieth duct 283 and a fourteenth duct 281, respectively.

The other side of the third narrowed portion 40*c* is connected to a sixth duct 226, which is connected to the second iron ore outlet 225 of the second fluidized bed furnace 220, and has a fourth exhaust gas inlet 241 which is located below the second conical distributor and connected to the melting furnace 100 through a eleventh duct 248.

The eleventh duct 248 is connected with a tenth duct 247 and the tenth duct 247 is merged with the ninth duct 246 and a thirteenth duct 271 which is connected to the third cyclone 270. A pig iron outlet 101 is formed in the melting furnace 100. Further, each of the second duct 214, the sixth duct 226, the ninth duct 246 and the twenty-first duct 226*a* is preferably provided with a purging gas inlet P so as to prevent the transport of iron ore from being blocked.

In FIG. 4, the dotted arrow represents a gas flow and the solid line indicates a ore flow.

On the other hand, as for the first fluidized bed furnace 210, the low-gas-velocity region 220B of the second fluidized bed furnace 220 and the second reaction furnace 240 of the third fluidized bed furnace 440, it is desirable to activate the gas fluidization in the lower part of each furnace and design the furnace in an expanded-upper-narrowed-lowered shape that the inner diameter of the upper part is larger than that of the lower part so as to decrease the gas velocity in the furnace, which can improve a gas consumption rate and prevent the elutriation of a ultrafine iron ore particles.

A method of reducing the fine iron ore by using the device of three-stage fluidized bed furnace type according to the present invention of FIG. 4 is described as follows.

The fine iron ore supplied from the hopper 290 into the first fluidized bed furnace 210 via the seventeenth duct 291 is dried/pre-heated in a state of its bubbling fluidization using the exhaust gas from the second cyclone 260 which is provided through the third duct 215 and the first exhaust gas inlet 211, and then supplied to the low-gas-velocity region 220A of the second fluidized bed furnace 220 via the first iron ore outlet 213 and the second duct 214.

By regulating the velocity of the exhaust gas of the third cyclone 270 supplied through the seventh duct and the exhaust gas of the fourth cyclone 280 supplied through the fifteenth duct 282, the medium/fine iron ore particles out of the fine iron ore transferred to the lower part of the low-gas-velocity region 220B of the second fluidized bed furnace 220 remains in the low-gas-velocity region 220B and is pre-reduced while forming a bubbling fluidized bed of the iron ore, and the coarse iron ore particles move down to the high-gas-velocity region 220A through the sixth iron ore outlet 227 and pre-reduced while forming a bubbling fluidized bed of the iron ore.

The medium/fine iron ore particles are transferred to the second reaction furnace 240 of the third fluidized bed furnace 440 via the second iron ore outlet 225 and the sixth duct 226, and the coarse iron ore particles are supplied to a first reaction furnace 230 of the third fluidized bed furnace 440 via a twenty-first iron ore outlet 226*a*.

The medium/fine iron ore particles supplied to the second reaction furnace 240 are lastly reduced by the exhaust gas of a melting furnace 100 supplied through a tenth duct 247, the eleventh duct 248 and a fourth exhaust gas inlet 241. The coarse iron ore particles supplied to the first reaction furnace 230 are finally reduced by the exhaust gas of the melting furnace 100 supplied through the third exhaust gas inlet 231 and supplied to the melting furnace 100 via the third iron ore outlet and an eighth duct 235.

The medium/fine iron ore which is finally reduced in the second reaction furnace 240 is transferred to the melting furnace 100 via the fourth iron ore outlet 245 and the twelfth duct 249.

A small amount of the coarse iron ore particles caused by an agglomeration may be contained in the medium/fine iron ore which is pre-reduced in the low-gas-velocity region of the second fluidized bed furnace 220 and supplied to the second reaction furnace 240.

To carry out a perfect classification for the iron ores, therefore, the agglomerated large iron ore particles are separated once more from the medium/fine iron ore particles and circulated into the first reaction furnace 230 through the fifth iron ore outlet 244.

That is, the coarse and medium/fine iron ores are finally reduced in the first and second reaction furnaces 230 and 240, respectively, by two different streams of the exhaust gas of the melting furnace 100 in different gas velocity while forming bubbling fluidized beds, and discharged through the third and fourth iron ore outlets 234 and 245, respectively. Then, they are melted and further reduced into metal phase in the melting furnace 100 and discharged as a pig iron through a hot metal outlet 101.

The fine iron ore entrained in a reducing gas supplied from the first fluidized bed furnace 210 is collected by a first cyclone 250 and re-circulated to the lower part of the first furnace 210 via the first duct 251. The fine iron ore entrained in a reducing gas supplied from the second fluidized bed furnace 220 is collected by the second cyclone 260 and re-circulates to the high-gas-velocity region 220A of the second furnace 220 via the fourth duct 261.

The medium/fine iron ore entrained in a reducing gas supplied from the first reaction furnace 230 is collected by the third cyclone 270 and re-circulated to the third reaction furnace 230 via a thirteenth duct 271, the tenth duct 247, the fifth iron ore outlet(center outlet) 244 and the ninth duct 246. The ultrafine iron ore particles entrained in a reducing gas supplied from the second reaction furnace 240 are collected by the fourth cyclone 280 and re-circulates to the lower part of the second reaction furnace 240.

In this embodiment, the gas velocity in each of the first fluidized bed furnace 210, the low-gas-velocity region 220B of the second fluidized bed furnace 220 and the second reaction furnace 240 is preferably kept to be 1.5–3.0 times of the minimum fluidization velocity of the iron ore resided in each furnace, the gas velocity in the upper part of each furnace is preferably kept to below the terminal velocity of iron ore being elutriated, and the gas velocity in each of the high-gas-velocity region 220A of the second fluidized bed furnace 220 and the first reaction furnace 230 is preferably 1.5–3.0 times as high as the minimum fluidization velocity of coarse iron ore particles.

Further, the second duct 214, the sixth duct 226, the ninth duct 246 and the twenty-first duct 226*a* are preferably provided with purging gas inlet P for introducing a small amount of reducing gas thereinto so as not to be clogged.

As described above, the third fluidized bed furnace of the present invention as shown in FIG. 4 employs a serial twin-type fluidized bed furnace (the second fluidized bed furnace) having two different reaction regions of different superficial gas velocity to carry out the pre-reductions of the coarse and medium/fine iron ores separately. This design was developed on the basis that the degradation of the fine iron ores is almost completed during the initial stage, pre-heating and pre-reduction, of a high-temperature fluidized bed reduction, and that a gas consumption rate can be improved by a separate fluidized bed reduction between coarse iron ore and the medium/fine iron ore.

The segregation between coarse and medium/fine iron ore can be controlled by adjusting the level(height) of the iron ore inlet (in the high-gas-velocity or low-gas-velocity region) in the serial twin-type fluidized bed furnace.

The iron ore particles pre-reduced in the low-gas-velocity region of the serial twin-type second fluidized bed furnace are almost in medium/fine size. However, a small amount of the coarse iron ore particles can be contained in the fluidized bed for the short time being before being fallen down to the first reaction furnace. And the portion of the coarse particles in the fluidized bed can be controlled by adjusting the level of the iron ore inlet in the low-gas-velocity region of the serial twin-type fluidized bed furnace. The coarse particles are eventually transferred into the first reaction furnace of the third fluidized bed furnace.

In this system, therefore, there is some time, although very short, when the coarse iron ore particles stay in the second reaction furnace before being transferred to the first reaction furnace. This short time existence of the coarse particles among the medium/fine iron ore particles can prevent a defluidization due to a sticking between fine particles which is an inherent problem in the conventional twin-type fluidized bed furnace.

In a conventional twin-type fluidized bed furnace, one side of the upper part of a first reaction furnace is connected to one side of the lower part of a second reaction furnace through a duct and the reducing gas velocity in the first reaction furnace is controlled to be higher than the terminal velocity of the medium iron ore particles, so that the medium/fine iron ore out of the iron ores supplied into the first reaction furnace is entrained in the reducing gas and transported into the second reaction furnace and thus reduced separately from the coarse iron ore.

Unlike the conventional twin-type fluidized bed furnace, according to the present invention, the pre-heated iron ore is firstly charged to the second reaction furnace which has a conical distributor inside thereof. The superficial gas velocity of the reducing gas in the second reaction furnace is controlled so that-only the medium/fine iron ore particles can be fluidized and the coarse iron ore particles fall down into the first reaction furnace. Therefore, the problem caused by the mixing between a reacted gas and a non-reacted gas in the conventional twin-type furnace can be solved by separating the coarse iron ore from the medium/fine iron ore and finally reducing them in different reaction furnaces of bubbling fluidized beds.

Moreover, the present invention can prevent a sticking and a defluidization in the second reaction furnace, because there is some time, although very short, when the coarse iron ore stays in the second reaction furnace before falling down into the first reaction furnace, and the coarse iron ore particles produced by the agglomeration of the fine iron ore particles can be discharged as well as the initially coarse iron ore particles through the conical gas distributor which is fitted with a center outlet.

It will be apparent to those skilled in the art that various modifications and variations can be made in the device of three-stage fluidized bed furnace type for reducing a fine iron ore according to the present invention without departing from the spirit or scope of the invention. Thus, it is intended that the present invention cover the modifications and variations of this invention provided they come within the scope of the appended claims and their equivalents.

Now the present invention will be described based on a actual example.

Example 1

A fine iron ore having the size and chemical composition as listed in Table 2 was reduced under the operating conditions as listed in Tables 2 to 4 using the reducing device as can be seen in FIG. 2 and Table 1.

TABLE 1

| Dimensions of fluidized bed type reducing furnaces | |
|---|---|
| First Fluidized Bed Furnace | |
| Inner Diameter of Narrowed Portion | 0.3 m |
| Height of Tapered Portion + Narrowed Portion | 4.0 m |
| Inner Diameter of Expanded Portion | 0.9 m |
| Height of Expanded Portion | 2.5 m |
| Second Fluidized Bed Furnace | |
| Inner Diameter of Narrowed Portion | 0.3 m |
| Height of Tapered Portion + Narrowed Portion | 4.0 m |
| Inner Diameter of Expanded Portion | 0.9 m |
| Height of Expanded Portion | 2.5 m |
| First Reaction Furnace of Third Fluidized Bed Furnace | |
| Inner Diameter of Narrowed Portion | 0.2 m |
| Height of Tapered Portion + Narrowed Portion | 5.2 m |
| Second Reaction Furnace of Third Fluidized Bed Furnace | |
| Inner Diameter of Narrowed Portion | 0.5 m |
| Height of Tapered Portion + Narrowed Portion | 2.7 m |
| Inner Diameter of Expanded Portion | 0.9 m |
| Height of Expanded Portion | 2.3 m |

TABLE 2

| Operating Conditions of Iron Ore | |
|---|---|
| Chemical Composition of Iron Ore: | |
| T.Fe: | 62.36%, |
| $SiO_2$: | 5.65%, |
| $Al_2O_3$: | 2.91%, |
| S: | 0.007%, |
| P: | 0.065% |
| Particle Size Distribution: | |
| −0.25 mm: | 22%, |
| 0.25–1.0 mm: | 28%, |
| 1.0–5.0 mm: | 50% |
| Charging Rate: | 5 Kg/min |
| Discharging Rate from Third Iron Ore Outlet: | 1.7 Kg/min |
| Discharging Rate from Fourth Iron Ore Outlet: | 2.2 Kg/min |

TABLE 3

| Operating Conditions of Reducing Gas | |
|---|---|
| Chemical Composition: | |
| CO: | 65%, |
| $H_2$: | 25%, |
| $CO_2 + H_2O$: | 10% |
| Temperature: | about 850° C. |
| Pressure: | 1.3 kgf/cm$^2$ |

TABLE 4

| Superficial Gas Velocity In Reducing Furnaces | |
|---|---|
| First Fluidized Bed Furnace | |
| Narrowed Portion | 2.22 m/s |
| Expanded Portion | 0.25 m/s |
| Second Fluidized Bed Furnace | |
| Narrowed Portion | 2.22 m/s |
| Expanded Portion | 0.25 m/s |
| First Reaction Furnace of Third Fluidized Bed Furnace: | 3.0 m/s |
| Second Reaction Furnace of Third Fluidized Bed Furnace | |
| Narrowed Portion | 0.32 m/s |
| Expanded Portion | 0.25 m/s |

As a result of the above-conditioned experiment using the fine iron ore of wide sized distribution, the average gas utilization degree was about 30% and the gas consumption rate was about 1250 Nm$^3$/ton-ore. Further, the iron-production rate was excellent because reduced iron was produced within 60 minutes, and of which average reduction degree obtained from the third and fourth iron ore outlets were about 90%.

The coarse iron ore out of the pre-reduced iron ore supplied to the second reaction furnace is separated from the medium/fine iron ore by regulating the gas velocity and by using a conical gas distributor fitted with a center outlet in the second reaction furnace. The coarse ore, then, is transferred to the first reaction furnace and finally reduced in the furnace. Therefore, the gas consumption rate can be reduced because the coarse iron ore, which takes a longer time than the medium/fine iron ore to be reduced can be reduced to some degree in the course of passing the second reaction furnace before being transferred into the first reaction furnace.

This invention also could solve the problem of a sticking and a defluidization in the second reaction furnace by discharging the coarse iron ore produced through an agglomeration between fine iron ore particles as well as the initially coarse iron ore particles supplied to the second reaction furnace using the conical gas distributor fitted with a center outlet provided in the second reaction furnace.

Example 2

A fine iron ore having the size and chemical composition as listed in Table 2 was reduced under the operating conditions as listed in Tables 2, 3 and 6 using the reducing device as shown in FIG. 4 and Table 5.

TABLE 5

| Dimensions of fluidized bed type reducing furnaces | |
|---|---|
| First Fluidized Bed Furnace | |
| Inner Diameter of Narrowed Portion | 0.3 m |
| Height of Tapered Portion + Narrowed Portion | 4.0 m |
| Inner Diameter of Expanded Portion | 0.9 m |
| Height of Expanded Portion | 2.5 m |
| Second Fluidized Bed Furnace | |
| High-Gas-Velocity Region | |
| Inner Diameter | 0.2 m |
| Height | 5.2 m |
| Low-Gas-Velocity Region | |
| Inner Diameter of Narrowed Portion | 0.5 m |
| Height of Tapered Portion + Narrowed Portion | 2.7 m |
| Inner Diameter of Expanded Portion | 0.9 m |
| Height of Expanded Portion | 2.3 m |
| First Reaction Furnace of Third Fluidized Bed Furnace | |
| Inner Diameter | 0.2 m |
| Height | 5.2 m |
| Second Reaction Furnace of Third Fluidized Bed Furnace | |
| Inner Diameter of Narrowed Portion | 0.5 m |
| Height of Tapered Portion + Narrowed Portion | 2.7 m |
| Inner Diameter of Expanded Portion | 0.9 m |
| Height of Expanded Portion | 2.3 m |

TABLE 6

| Superficial Gas Velocity | |
|---|---|
| First Fluidized Bed Furnace | |
| Narrowed Portion | 2.22 m/s |
| Expanded Portion | 0.25 m/s |
| Second Fluidized Bed Furnace | 3.0 m/s |
| High-Gas-Velocity | |
| Low-Gas-Velocity | |
| Narrowed Portion | 0.32 m/s |
| Expanded Portion | 0.25 m/s |
| First Reaction Furnace of Third Fluidized Bed Furnace | 3.0 m/s |
| Second Reaction Furnace of Third Fluidized Bed Furnace | |
| Narrowed Portion | 0.32 m/s |
| Expanded Portion | 0.25 m/s |

As a result of the above-conditioned experiment using the fine iron ore of wide sized distribution, the average gas utilization degree gas was about 30% and the gas consumption rate was about 1250 Nm$^3$/ton-ore as those obtained from the first embodiment. Further, the iron-production rate was excellent because reduced iron was produced within 60 minutes, and of which average reduction degree measured from the third and fourth iron ore outlet were about 90%.

The iron ore particles pre-reduced in the low-gas-velocity region of the serial twin-type second fluidized bed furnace and later supplied to the second reaction furnace are almost in medium/fine size. However, a small amount of the coarse iron ore particles could be contained in the fluidized bed up to about 10–20% of the bed weight by adjusting the level (height) of the iron ore inlet in the low-gas-velocity region of the serial twin-type fluidized bed furnace, and the coarse iron ore is transferred(fallen down) to the first reaction furnace of the third fluidized bed furnace.

In this system, therefore, there is some time, although very short, when the coarse iron ore particles stay in the second reaction furnace before being transferred to the first reaction furnace. This short time existence of the coarse parcels among the medium/fine iron ore particles prevents a defluidization due to a sticking between fine particles which is an inherent problem in the conventional twin-type fluidized bed furnace.

What is claimed is:

1. Apparatus for reducing a fine iron ore, comprising:

a first single fluidized bed furnace for drying/pre-heating a fine iron ore in a bubbling fluidized state;

a first cyclone for collecting fine iron ore particles entrained in an exhaust gas from the first fluidized bed furnace;

a second single fluidized bed furnace for pre-reducing the fine iron ore dried/pre-heated in the first fluidized bed furnace;

a second cyclone for collecting fine iron ore particles entrained in an exhaust gas from the second fluidized bed furnace;

a third twin fluidized bed furnace comprising a first cylindrical reaction furnace and a second reaction furnace for finally reducing a coarse iron ore and a medium/fine iron ore, respectively, which are pre-reduced in the second fluidized bed furnace;

a third cyclone for collecting medium/fine iron ore particles entrained in an exhaust gas from the first reaction furnace of the third fluidized bed furnace; and a fourth cyclone for collecting ultrafine iron ore particles entrained in an exhaust gas from the second reaction furnace of the third fluidized bed furnace, the first fluidized bed furnace comprising a first expanded portion, a first tapered portion and a first narrowed portion, the first narrowed portion having a first exhaust gas inlet at the bottom thereof, provided with a first gas distributor above the first exhaust gas inlet and having a first iron ore outlet in one side wall, the first expanded portion and the first narrowed portion connected to the first cyclone through a sixteenth duct and a first duct, respectively, and the first narrowed portion connected to a hopper through a seventeenth duct;

the second fluidized bed furnace comprising a second expanded portion, a second tapered portion and a second narrowed portion, the second narrowed portion having a second exhaust gas inlet at the bottom thereof, provided with a second gas distributor above the second exhaust gas inlet and having a second iron ore outlet in one side wall, the second expanded portion and the second narrowed portion connected to the second cyclone through an eighteenth duct and a fourth duct, respectively, the second narrowed portion connected to the first narrowed portion through a second duct and the first iron ore outlet, and the second cyclone connected to a first exhaust gas inlet through a third duct;

the first reaction furnace of the third fluidized bed furnace being in a cylindrical shape, having a third exhaust gas inlet at its bottom end so as to be supplied with the exhaust gas of a melting furnace, provided with a third gas distributor in its lower part, having a third iron ore outlet connected to the upper part of a melting furnace through an eighth duct and connected to the third cyclone through a nineteenth duct, and the upper part of the third cyclone connected to the second exhaust gas inlet through a seventh duct; and the second reaction furnace of the third fluidized bed furnace comprising a third expanded portion, a third tapered portion and a third narrowed portion, the third narrowed portion having a fifth iron ore outlet at the bottom thereof, provided with a fourth conical distributor inside of it and having a fourth iron ore outlet in one side thereof, the fourth iron ore outlet connected to the melting furnace through a twelfth duct, the third expanded portion and the third narrowed portion connected to the fourth cyclone through a twentieth duct and a fourteenth duct, respectively, the third narrowed portion connected to the second narrowed portion of the second fluidized bed furnace through a sixth duct and the second iron ore outlet, the upper part of the fourth cyclone connected to the seventh duct through a fifteenth duct, the third narrowed portion having a fourth exhaust gas inlet which is located below the fourth conical distributor and connected to the melting furnace through an eleventh duct, the fifth iron ore outlet connected to the first reaction furnace of the third fluidized bed furnace through a ninth duct, the ninth and eleventh ducts connected to a tenth duct, and the lower part of the third cyclone connected to the tenth duct through a thirteenth duct.

2. The apparatus as defined in claim 1, wherein the fifth iron ore outlet has a reducing fin therein.

3. Apparatus for reducing a fine iron ore, comprising:

a first single fluidized bed furnace for drying/pre-heating a fine iron ore in a bubbling fluidized state;

a first cyclone for collecting fine iron ore particles entrained in an exhaust gas of the first fluidized bed furnace;

a second single fluidized bed furnace for pre-reducing the fine iron ore dried/pre-heated in the first fluidized bed furnace;

a second cyclone for collecting fine iron ore particles entrained in an exhaust gas from the second fluidized bed furnace;

a third twin fluidized bed furnace comprising a first cylindrical reaction furnace and a second reaction furnace for finally reducing coarse iron ore particles and medium/fine iron ore particles, respectively, which are pre-reduced in the second fluidized bed furnace;

a third cyclone for collecting medium/fine iron ore particles entrained in an exhaust gas from the first reaction furnace of the third fluidized bed furnace; and a fourth cyclone for collecting ultrafine iron ore particles entrained in an exhaust gas from the second reaction furnace of the third fluidized bed furnace, the first fluidized bed furnace comprising a first expanded portion, a first tapered portion and a first narrowed portion, the first narrowed portion having a first exhaust gas inlet at the bottom thereof, provided with a first gas distributor above the first exhaust gas inlet and having a first iron ore outlet in one side wall, the first expanded portion and the first narrowed portion connected to the first cyclone through a sixteenth duct and a first duct, respectively, and the first narrowed portion connected to a hopper through a seventeenth duct;

the second fluidized bed furnace comprising a second expanded portion, a second tapered portion and a second narrowed portion, the second narrowed portion having a sixth exhaust gas inlet/iron ore center outlet at the bottom thereof, provided with a second conical distributor above the sixth exhaust gas inlet/iron ore center outlet and having a second iron ore outlet in one side thereof, the second expanded portion and the second narrowed portion connected to the second cyclone through an eighteenth duct and a fourth duct, respectively, the second narrowed portion connected to the first narrowed portion through a second duct and the first iron ore outlet, the second cyclone connected to the first exhaust gas inlet through a third duct, the sixth exhaust gas inlet/iron ore center outlet connected to the first reaction furnace of the third fluidized bed furnace through a fifth duct, the second narrowed portion having a second exhaust gas inlet in one side thereof, the first reaction furnace of the third fluidized bed furnace being in a cylindrical shape, having a third exhaust gas inlet connected to a melting furnace, provided with a third gas distributor in the lower part thereof, having a third iron ore outlet connected to the upper part of the melting furnace through an eighth duct and connected to the third cyclone through a nineteenth duct in the upper part thereof, and the upper part of the third cyclone connected to the sixth iron ore outlet through a seventh duct; and the second reaction furnace of the third fluidized bed furnace comprising a third expanded portion, a third tapered portion and a third narrowed portion, the third narrowed portion having a fifth iron ore outlet at the bottom thereof, provided with a fourth conical distributor inside of it and having a fourth iron ore outlet in one side thereof, the fourth iron ore outlet connected to the melting furnace through a twelfth duct, the third expanded portion and the third narrowed portion connected to the fourth cyclone through a twentieth duct and a fourteenth duct, respectively, the third narrowed portion connected to the second narrowed portion of the second fluidized bed furnace through a sixth duct and the second iron ore outlet, and the lower part of the third cyclone connected to a tenth duct through a thirteenth duct.

4. The apparatus as defined in claim 3, wherein each of he fifth and sixth iron ore outlets has a reducing fin therein.

5. Apparatus for reducing a fine iron ore of a wide particle size distribution, comprising:

a first single fluidized bed furnace for drying/pre-heating a fine iron ore while forming a bubbling fluidized bed;

a first cyclone for collecting fine iron ore particles entrained in an exhaust gas from the first fluidized bed furnace;

a second serial twin fluidized bed furnace comprising a high-gas-velocity region and a low-gas-velocity region, classifying the fine iron ore of wide size distribution dried/pre-heated in the first fluidized bed furnace into coarse and medium/fine iron ore particles and pre-reducing them separately in the bubbling fluidized bed, respectively;

a second cyclone for collecting fine iron ore particles entrained in an exhaust gas from the second fluidized bed furnace;

a third twin fluidized bed furnace comprising a first cylindrical reaction furnace and a second reaction furnace for finally reducing coarse iron ore particles pre-reduced in the high-gas-velocity region and medium/fine iron ore particles pre-reduced in the low-gas-velocity region, respectively;

a third cyclone for collecting medium/fine iron ore particles entrained in an exhaust gas from the first reaction furnace of the third fluidized bed furnace; and a fourth cyclone for collecting ultrafine iron ore particles entrained in the second reaction furnace from the third fluidized bed furnace, the first fluidized bed furnace comprising a first expanded portion, a first tapered portion and a first narrowed portion, the first narrowed portion having a first exhaust gas inlet at the bottom thereof, provided with a first gas distributor above the first exhaust gas inlet and having a first iron ore outlet in one side wall, the first expanded portion and the first narrowed portion connected to the first cyclone through a sixteenth duct and a first duct, respectively, and the first narrowed portion connected to a hopper through a seventeenth duct;

the second fluidized bed furnace comprising the high-gas-velocity region and the low-gas-velocity region including a second expanded portion, a second tapered portion and a second narrowed portion, the high-gas-velocity region having a second exhaust gas inlet at the bottom thereof and provided with a second distributor in its lower part, the low-gas-velocity region having a sixth iron ore outlet at the bottom thereof, provided with a conical gas distributor plate in the lower part thereof, the second narrowed portion having a fifth exhaust gas inlet and a second iron ore outlet in the lower part thereof, the second expanded portion and the second narrowed portion connected to the second cyclone through an eighteenth duct and a fourth duct, respectively, the second narrowed portion connected to the first narrowed portion through a second duct, and the second cyclone connected to the first exhaust gas inlet through a third duct;

the first reaction furnace of the third fluidized bed furnace being in a cylindrical shape, having a third exhaust gas inlet at its bottom end so as to be supplied with the exhaust gas of a melting furnace, provided with a third gas distributor in the lower part thereof, having a third iron ore outlet connected to the upper part of the melting furnace through an eighth duct and connected to the third cyclone through a nineteenth duct, the upper part of the third cyclone connected to the second exhaust gas inlet through a seventh duct, and the first reaction furnace connected to the high-gas-velocity region of the second fluidized bed furnace through a twenty-first duct; and the second reaction furnace of the third fluidized bed furnace comprising a third expanded portion, a third tapered portion and a third narrowed portion, the third narrowed portion having a fifth iron ore outlet at the bottom thereof, provided with a fourth conical distributor inside of it and having a fourth iron ore outlet in one side thereof, the fourth iron ore outlet connected to the melting furnace through a twelfth duct, the third expanded portion and the third narrowed portion connected to the fourth cyclone through a twentieth duct and a fourteenth duct, respectively, the third narrowed portion connected to the second narrowed portion of the second fluidized bed furnace through a sixth duct, the upper part of the fourth cyclone connected to the low-gas-velocity region of the second fluidized bed furnace through a fifteenth duct, the third narrowed portion having a fourth exhaust gas inlet which is located below the second conical distributor and connected to the melting furnace through an eleventh duct, the fifth iron ore outlet connected to the third fluidized bed furnace through a ninth duct, the ninth and eleventh ducts connected to a tenth duct, and the lower part of the third cyclone connected to the tenth duct through a thirteenth duct.

6. The apparatus as defined in claim 5, wherein the upper part of the high-gas-velocity region of the second fluidized bed furnace has a reducing fin so as to increase the gas velocity.

* * * * *

UNITED STATES PATENT AND TRADEMARK OFFICE

CERTIFICATE OF CORRECTION

PATENT NO. : 5,897,829

DATED : April 27, 1999

INVENTOR(S) : Hang Goo Kim et al.

It is certified that error appears in the above-identified patent and that said Letters Patent is hereby corrected as shown below:

Column 8 Line 34 after "narrowed portion" delete period --.--.

Column 12 Line 6 "that-only" should read --that only-- (delete hyphen).

Signed and Sealed this

Sixteenth Day of November, 1999

Attest:

Q. TODD DICKINSON

Attesting Officer

*Acting Commissioner of Patents and Trademarks*